United States Patent [19]

Pippin

[11] Patent Number: 5,288,201
[45] Date of Patent: * Feb. 22, 1994

[54] VACUUM BEAM PRODUCT DISPENSER AND SINGULATOR AND METHOD FOR SINGULATING PRODUCTS

[75] Inventor: James M. Pippin, Keller, Tex.

[73] Assignee: ElectroCom Automation L.P., Arlington, Tex.

[ * ] Notice: The portion of the term of this patent subsequent to Jul. 14, 2008 has been disclaimed.

[21] Appl. No.: 933,661

[22] Filed: Aug. 24, 1992

Related U.S. Application Data

[60] Continuation of Ser. No. 755,174, Sep. 5, 1991, Pat. No. 5,161,937, which is a division of Ser. No. 481,340, Feb. 20, 1990, Pat. No. 5,064,341.

[51] Int. Cl.$^5$ ............... B65H 3/08; B65G 69/00
[52] U.S. Cl. ............... 414/795.8; 414/797.6; 414/416; 414/786
[58] Field of Search ............... 414/797.6, 786, 416, 414/497.4, 797.7, 795.8, 795.4, 798; 186/52, 55; 198/453, 471.1, 808.5, 954, 810, 464.2, 836.2; 271/12, 35, 94, 99, 103, 202, 260, 273; 221/1, 123, 129, 131, 133, 211

[56] References Cited

U.S. PATENT DOCUMENTS

| | | | |
|---|---|---|---|
| 3,155,218 | 11/1964 | Creed | 198/954 X |
| 3,219,829 | 11/1965 | Reist | 198/958 X |
| 3,587,674 | 6/1971 | Adkin | 198/954 X |
| 3,592,326 | 7/1971 | Zimmerle et al. | 198/395 X |
| 3,626,656 | 12/1971 | Langenscheidt | 198/810 X |
| 4,000,821 | 1/1977 | Naito et al. | 414/797.6 |
| 4,142,454 | 3/1979 | Staufner | 414/797.6 |
| 4,452,441 | 6/1984 | Poag | 271/93 |
| 4,541,521 | 9/1985 | Menge | 198/464.2 X |
| 4,572,497 | 2/1986 | Dreschel et al. | 198/803.5 X |
| 4,674,940 | 6/1987 | Uchida et al. | 198/464.2 X |
| 4,724,947 | 2/1988 | Opperthauser | 198/453 X |
| 5,064,341 | 11/1991 | Pippin | 414/797.6 |

*Primary Examiner*—David A. Bucci
*Attorney, Agent, or Firm*—Harold E. Meier

[57] ABSTRACT

A vacuum beam product dispenser and singulator to dispense and singulate "soft" products in an automated order dispensing system (AOS) is comprised of a product cartridge and an inclined conveyor belt. The conveyor belt picks the products from the bottom of the cartridge using a vacuum control element and carries it up the conveyor until it reaches a pinch roller that holds the product ready to be dispensed to a central conveyor of the AOS. Products are picked from the product cartridge by the inclined conveyor in an unbalanced position such that a product will fall off the conveyor unless held by a vacuum generated by the vacuum control element. Thus, random multiples removed from the cartridge with the picked product fall off the conveyor. The product stream from the hopper is thereby singulated.

16 Claims, 4 Drawing Sheets

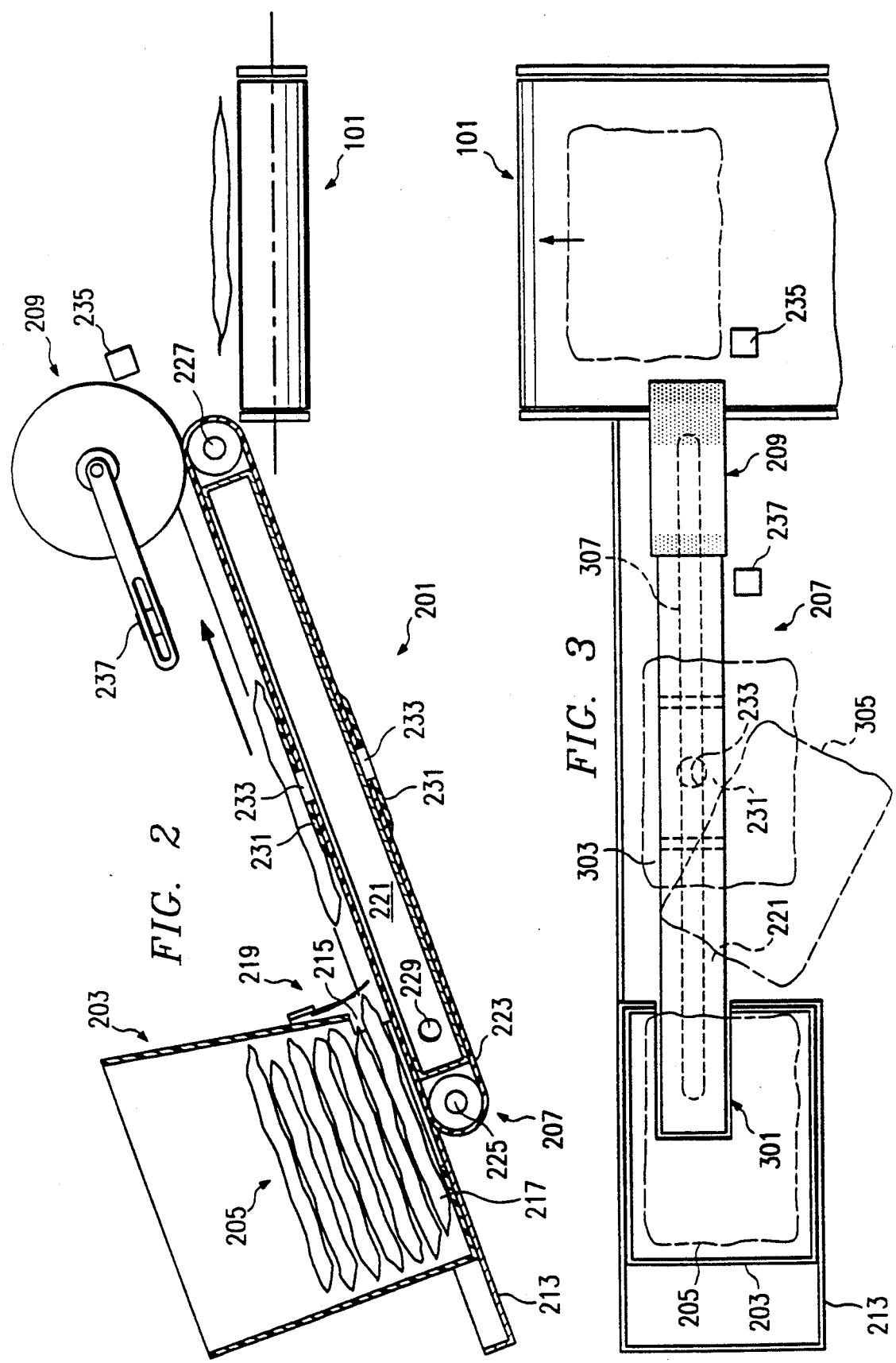

VACUUM BEAM PRODUCT DISPENSER AND SINGULATOR AND METHOD FOR SINGULATING PRODUCTS

This application is a continuation of application Ser. No. 07/755,174 filed Sep. 5, 1991, now U.S. Pat. No. 5,161,937 which is a division of application Ser. No. 07/481,340 filed Feb. 20, 1990, now U.S. Pat. No. 5,064,341.

FIELD OF THE INVENTION

The field to which the invention pertains is product dispensers for automatic order dispensing systems.

BACKGROUND OF THE INVENTION

Some distribution centers are designed to supply less than case lot quantities of a large variety of products to a number of different customers. The process of assembling orders for less than case lot quantities of products is generally referred to as "broken case order picking." These centers sometimes invest in automated order dispenser systems (AOS) to reduce cost and errors associated with broken case order picking.

A typical AOS is comprised of a central conveyor and a plurality of product dispensers mounted on either side of the conveyor. Each product dispenser is loaded with a particular product. A central controller causes the necessary dispensers to place on the central conveyor the correct quantity of the particular products required to fill the order. At the end of the conveyor, the products are packaged for delivery to the customer.

AOS have been used in the past mostly for products that are prepackaged in containers having a relatively fixed or immutable shape or geometry, such as, for example, products packaged in rectangular cardboard boxes. Product dispensers for products with a fixed geometry are relatively simple to manufacture and to operate reliably. Typically, products are dispensed from a channel in which they are stacked vertically. A pneumatically-operated piston or synchronized cog pushes the product through an opening at one end of the cartridge just big enough for one box. In this manner, the product dispenser is said to "singulate" the stacked products into a product stream for single dispensing.

AOS generally have not been used to dispense so-called "soft" products because prior art product dispensers are not capable of reliably singulating them. Soft products have, to some degree, mutable geometries. Soft products might include, for example, shirts, dresses, underwear and the like, either unpackaged or packaged in flexible plastic wrapping. Prior art product dispensers typically utilize "aggressive" stripping techniques to singulate or prevent more than one product from being dispensed at a time. One example of such a system is the product dispenser previously described having an opening just large enough for the boxed product to pass through. Though the aggressive stripper works well with boxed or rigid products, soft products can easily "clog" or "jam" the opening in the channel. If the opening is made large enough to reduce significantly the possibility of clogging, friction between products may cause more than one product to be pushed out of the channel. These extra products are termed in the art "random multiples". This loss of control of the number of products dispensed is usually intolerable for a system that is designed to reduce errors in filling orders and to increase efficiency. A dispenser for soft products must provide the necessary product singulation.

BRIEF SUMMARY OF THE INVENTION

Singulation for soft products is achieved according to the present invention by utilizing a "vacuum beam" product dispenser and singulator that eliminates from the dispenser's product stream random multiples. A relatively narrow, inclined conveyor with a low friction surface includes a high-friction exciter pad with a vacuum control element to excite and pick an "off-balance" product from the bottom of a stack of products in a hopper or cartridge. The hopper or cartridge, having a bottom slot and a front opening, is placed on the low end of the conveyor such that the stack of products overlays the low end of the inclined conveyor and extends over one edge of the conveyor so both the picked product and any random multiple are pulled "off-center" and not balanced on the conveyor. The products tend to slide and fall off the edge of the conveyor due to their inertia and an unsupported center of gravity. The vacuum control element, though, holds the picked product on the conveyor, while random multiples that are pulled out of the hopper or cartridge with the picked product fall off of the conveyor into a collection bin. The random multiples are collected and then recirculated to the product hopper or cartridge.

Although many of the inherent advantages of such a system will be recognized from the proceeding description, one important advantage is its low cost and simplicity, permitting many product dispensers to be utilized in an AOS. Other advantages include the option to use the case or packaging for the product as a product hopper in which the products are already packed in a stack and thus ready to be set directly onto the vacuum beam product dispenser. The case or packaging would be equipped with tear-away tabs on its front and bottom to permit the inclined conveyor to pick the product from the cartridge-like container. An automated system may also be used to replenish products to be dispensed to the vacuum beam dispenser and singulator.

BRIEF DESCRIPTION OF THE DRAWINGS

FIG. 2 is a cross-sectional side view of a vacuum beam product dispenser.

FIG. 3 is a top view of the vacuum beam product dispenser.

DETAILED DESCRIPTION OF THE DRAWINGS

Figure 1:
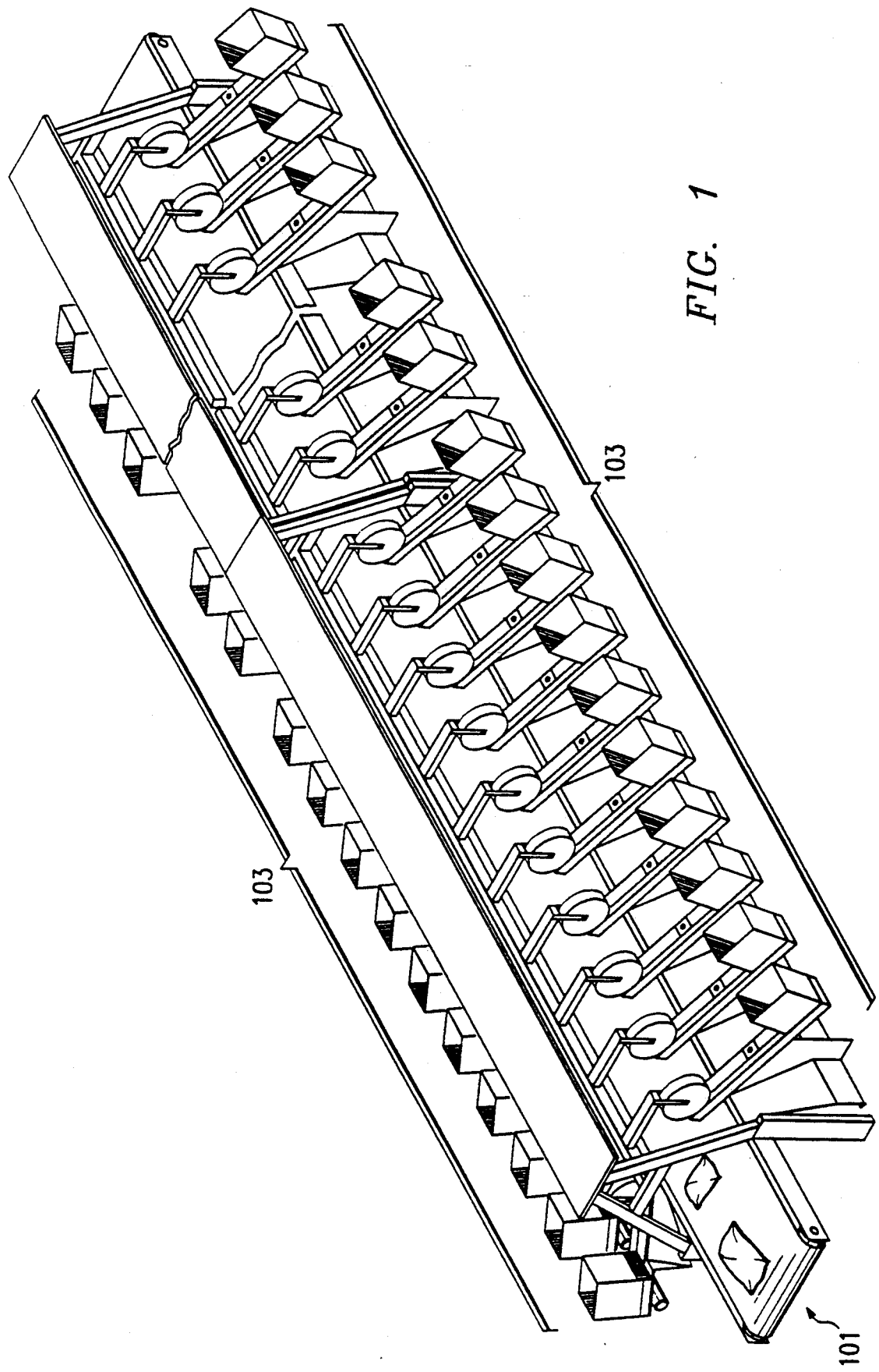
FIG. 1 is an illustration of an automatic order dispensing system.

Referring now to FIG. 1, an automated order dispensing system (AOS) is comprised of a central conveyor 101 that is flanked on either side by a plurality of product dispensers 103. Each product dispenser dispenses one type of product. An order for prescribed quantities of certain products is received by an AOS central controller, not shown, of the AOS. The central controller issues control commands to certain product dispensers to dispense the necessary quantity of selected products onto the central conveyor 101. The dispensed products that fill the order reach the end of the central conveyor at approximately the same time or in a consecutive sequence and are packaged for shipment.

Referring now to FIG. 2, a vacuum beam product dispenser and singulator 201 for an AOS is comprised of a product cartridge 203, in which are stacked the products 205 to be dispensed, vacuum beam 207, and a compressible pinch roller 209. The vacuum beam product dispenser and singulator is shown in conjunction with the central conveyor 101 of the AOS. The product cartridge 203 is placed on a platform 213. A first opening 215 defined in the front wall of cartridge 203 is at least large enough to pass the bottom product 217 and preferably large enough to insure that products will not jam or block the opening during operation of the product dispenser. A passive stripper 219 of a flexible plastic or rubber material assists in minimizing random multiple products from passing through the opening 215.

Vacuum beam 207 is comprised of a vacuum manifold 221, conveyor belt 223 and rollers 225 and 227. A motor, not shown, drives roller 225, which, in turn, drives the conveyor belt 223. The vacuum manifold 221 is coupled to a high flow vacuum source, not shown, through port 229. Several vacuum beam product dispensers and singulators share a common vacuum source.

Conveyor belt 223 has a low friction surface, except for two product exciter and carrier pads 231 spaced equidistant from each other along the surface of the conveyor belt. The surface of each pad is raised from the surface of the conveyor belt and has a high coefficient of friction. The exciter pad assists in dislodging the product 217 on the bottom of the product stack 205. Defined in each exciter pad is a vacuum control element 233 opening to the vacuum manifold 221. In combination with the high friction surface of the exciter pad, the attraction force from the vacuum control element places the bottom product 217 under vacuum control. A product under vacuum control acts as a vacuum seal or valve to prevent flow through the vacuum control element.

The conveyor belt 223 is inclined at an angle of between approximately twenty degrees and up to ninety degrees to the surface of the central conveyor 101. Products not under vacuum control will slip on conveyor belt 223 due to their inertia and the low friction surface of the belt. The angle of inclination for a particular conveyor belt 223 is determined by the product, including weight and friction, or the product package. Products with surfaces having a higher friction require greater angles of inclination.

A product under vacuum control is conveyed up to a fixed compressible foam pinch roller 209. However, random multiples slide off the conveyor belt before reaching the pinch roller 209. The presence of a product driven under vacuum control to the pinch roller 209, is sensed by a photoelectric cell 235. The photoelectric cell 235 causes the conveyor belt 223 to stop at a point at which the product is under the control of the pinch roller. The product is then poised to be dispensed onto central conveyor 101. When the product is to be delivered onto the central conveyor 101, the conveyor belt 223 is activated by the AOS central controller so that the product is deposited onto the central conveyor belt 101. The vacuum beam conveyor belt 223 continues to be driven until another product is placed under control of the pinch roller 209 and sensed by the photoelectric cell 235.

A second photoelectric cell 237 serves as an overlapping product detector. The position of the photoelectric cell 237 is adjusted along the length of the conveyor belt 223 so that the distance between photoelectric cells 235 and 237 is at least as long as a single product or package. If both photoelectric cells 235 and 237 simultaneously sense a product, at least one random multiple, in addition to the picked product under vacuum control, has reached the top of the conveyor belt 223. When an overlapping condition is sensed, the AOS central controller will not activate the conveyor belt to dispense the product.

Referring now to FIG. 3, there is shown a top view of the vacuum beam product dispenser and singulator 201 illustrating that the conveyor belt 223 is relatively narrow, with one edge positioned along the edge of the vacuum manifold 221. Product cartridge 203 includes a conveyor belt slot 301 where it overlays the conveyor belt 223. The slot is at least as wide as conveyor belt 223 and extends from the front edge of the bottom of the cartridge 203 toward its back edge far enough to insure that the cartridge does not engage the conveyor belt 223 and to permit the product exciter pad 231 to engage the product 217 at the bottom of the stack 205 and place that product under vacuum control. The center of conveyor belt slot 301 is not centered between the sides of cartridge 203, but to one side of the center of the cartridge. Preferably, the edge 302 of the conveyor belt 223 is to one side of the center of gravity of the products in the stack of products 205. Products pulled from the hopper or cartridge 203 are not balanced on the vacuum beam 207 and as a result the center of gravity is not supported by the vacuum beam. As a result of this configuration, only products under vacuum control will remain on the conveyor belt 223 long enough to be driven to pinch roller 209. Random multiples pulled from the hopper or cartridge 203 along with the product under vacuum control drop off to one side of the conveyor belt 223 before reaching the pinch roller.

Product 303 is shown to be under vacuum control as it is being driven toward pinch roller 209. Product 305 is a random multiple pulled from the cartridge 203 at the same time as product 303. Because it is not under vacuum control, it will fall off one side of conveyor belt 223 due to its inertia and unsupported center of gravity. In this manner, the vacuum beam product dispenser singulates the flow of products to be dispensed.

The angle of inclination of conveyor belt 223 and the length thereof are chosen to ensure that all random multiples fall off before reaching the pinch roller, yet do not slide backward into the hopper and cause jams.

Vacuum manifold 221 includes a slot 307 defined in a longitudinal direction along its upper surface. Conveyor belt 223 forms a moving seal over the slot 307 to help maintain the high flow vacuum within the vacuum manifold 221. Vacuum control originates from vacuum control element 233 only while the opening 233 is positioned over the slot 307. Vacuum control is thus provided from the cartridge 203 to pinch roller 209 as an exciter pad 231 moves with the conveyor belt 223. Because the vacuum in the manifold 221 has high flow capacity, the product 303 need not make a perfect seal over vacuum control element 233.

Although not shown, another embodiment of the invention has the vacuum beam tilted around its longitudinal axis in the direction that random multiples fall off the beam.

Figure 4:
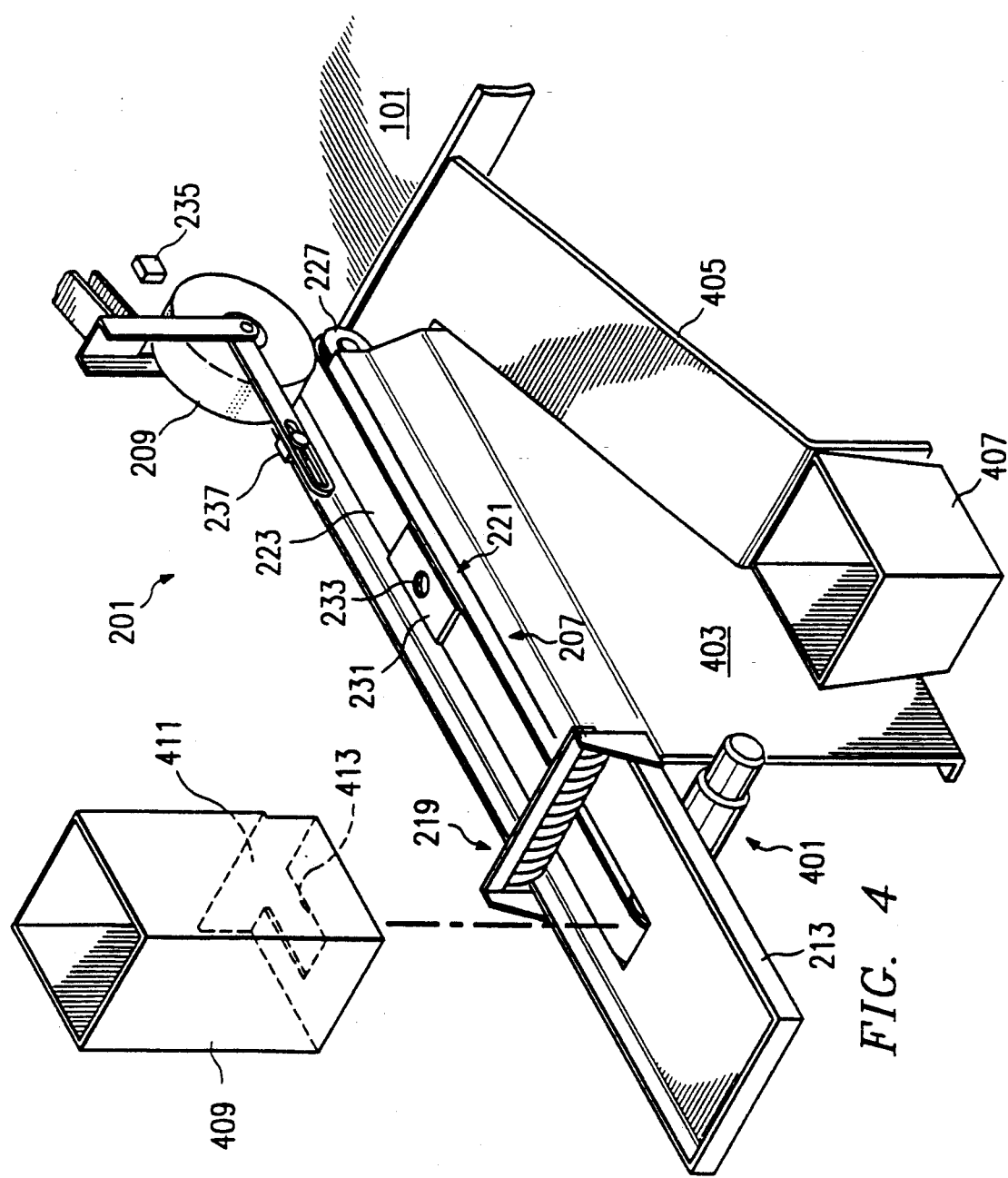
FIG. 4 is a perspective drawing of the vacuum beam product dispenser.

Referring now to FIG. 4, there is shown a perspective of the vacuum beam product dispenser and singulator 201. An electric motor 401 drives the conveyor belt 223 in the direction of the pinch roller 209. Vacuum beam 207 is supported by a partition frame 403. In combination with slide 405, the partition and frame 403 directs random multiples that fall off of the conveyor belt 223 into a multiples tote 407. In operation, the multiples tote 407 is periodically checked and the multiples collected to be redispensed.

In order to improve the efficiency of replenishing a product dispenser with products to dispense, the step of transferring the products from their original case lot packaging to the product cartridge 203 shown in FIG. 2 may be eliminated by stacking the products in a package that is set directly on platform 213 as a product hopper 409. As illustrated, the conveyor belt opening 413 and product hopper has an opening 411 sufficiently large to permit more than one product to be pulled therefrom.

Figure 5:
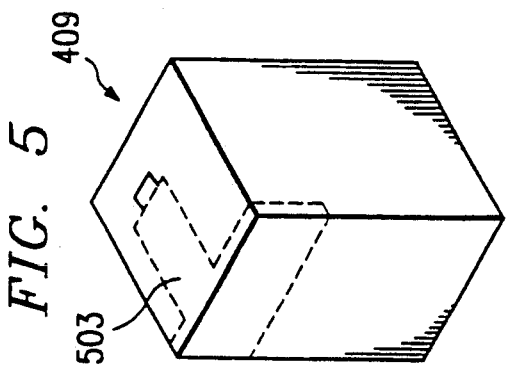
FIG. 5 illustrates a product package equipped with pull-tab openings for use as a product hopper with the system of the present invention.

Referring now to FIG. 5, the product hopper 409 is constructed from any suitable packaging material and includes a tear away pull tab 503 formed as shown. Tear away tab 503 creates openings in the packaging such as is shown by product opening 411 and conveyor belt opening 413 in FIG. 4.

Figure 6A:
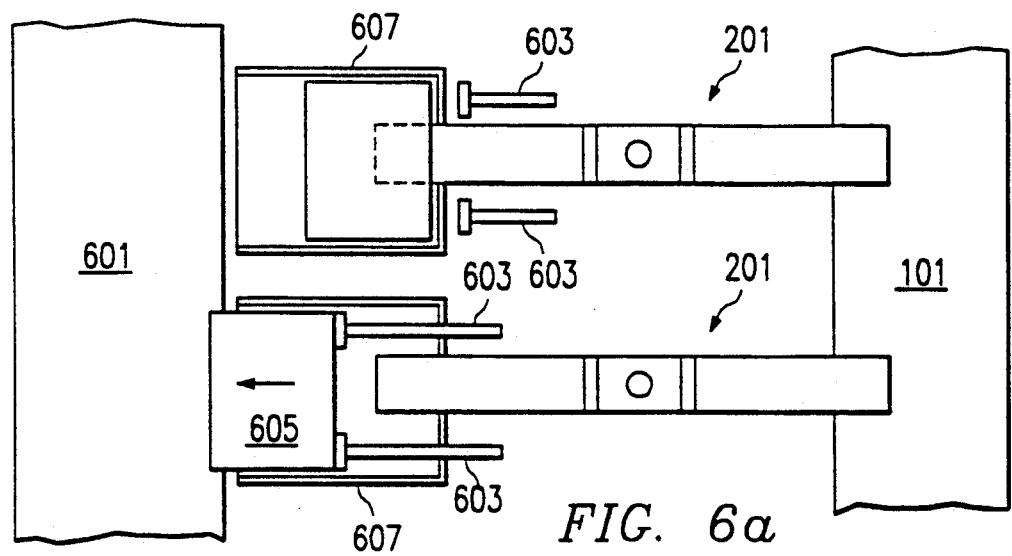
FIGS. 6a and 6b are schematic drawings of an automated replenishment system for a vacuum beam product dispenser.
Figure 6B:
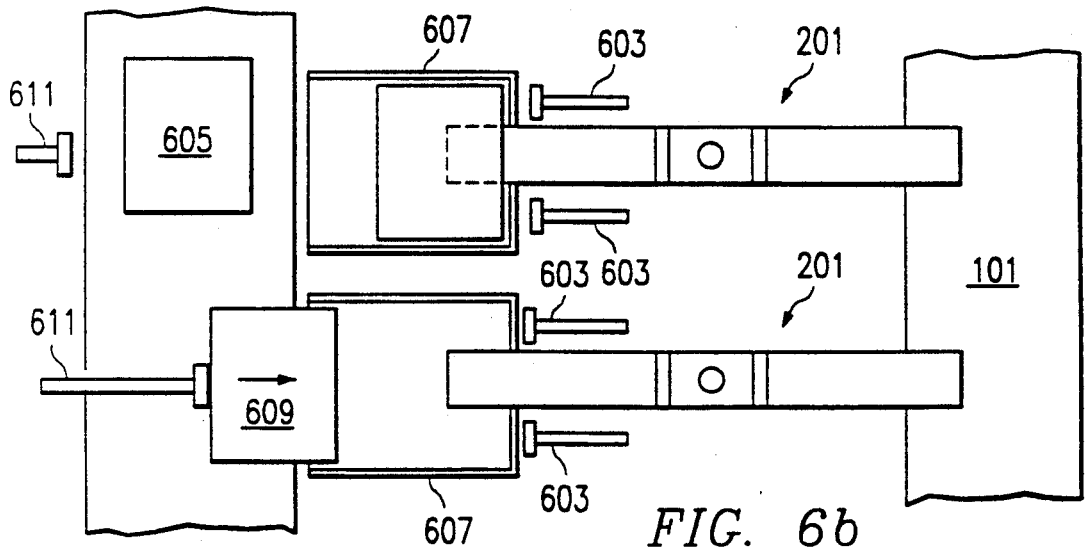

Referring now to FIGS. 6a and 6b, an automated replenishing system may be used to further automate the replenishing process. The automated replenishing system is comprised of a replenishing conveyor 601 which travels in both directions parallel to the central conveyor 101. To replenish a product hopper, a first ram 603 pushes a product container 605, which may be a hopper or cartridge, off of platforms 607 of vacuum beam dispensers 201 and on to the replenishing conveyor 601. The first ram 603 may be comprised of a pneumatically-operated piston, as shown, a synchronized cog, or a conveyor belt.

As shown in FIG. 6b, once an empty product container 605 is placed on to conveyor 601, the conveyor moves to position a full product container 609 to be removed into a dispensing position. A second pushing ram 611, comprised of pneumatically-operated piston, pushes a full product container 609 onto product platform 607. It is possible for first pushing ram 603 and second pushing ram 611 to be combined into a single unit that pushes and pulls the container 605 and 609 off and on product platform 607. This automated replenishing system permits continuous dispensing of a product which, in turn, permits continuous operation of the AOS.

Figure 7:
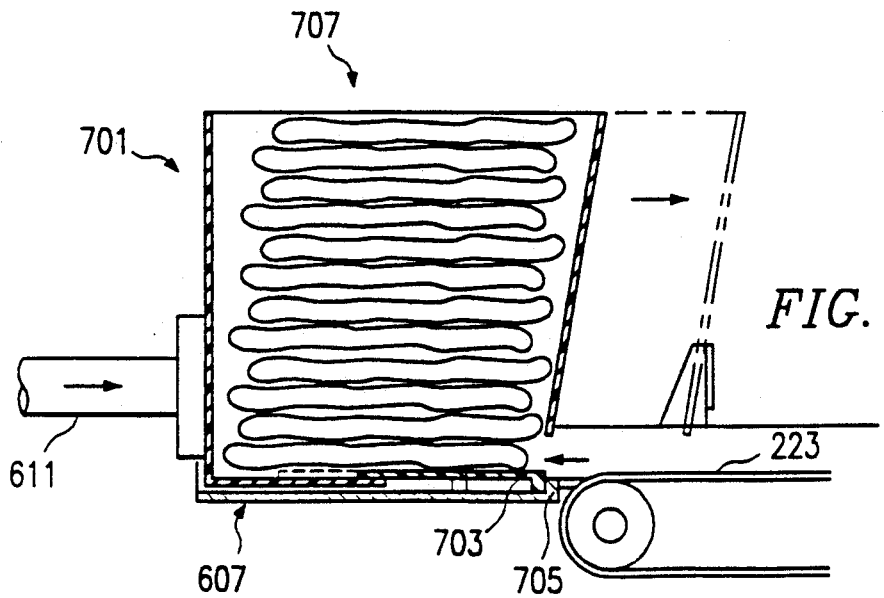
FIG. 7 is a cross-sectional view of a product cartridge suitable for use in connection with an automated replenishment system for a vacuum beam product dispenser.

Referring now to FIG. 7, a product cartridge 701, suitable for use with the automated replenishment system described in connection with FIG. 6a and 6b, has a sliding trap door 703. When pushed on to product platform 607 with pushing ram 611, the leading edge of the trap door 703 is pushed back by the front edge of product platform 607, thereby exposing the bottom product of the stacked products 707 to the conveyor belt 223. The opening provided by the retracted sliding trap door is at least as large as the section of the conveyor belt 223 overlaid by hopper 701 when fully pushed onto platform 607.

While the invention has been described in connection with a preferred embodiment, it is not intended to limit the scope of the invention to the particular form set forth, but, on the contrary, it is intended to cover alternatives, modifications, equivalents as may be included within the spirit and scope of the invention as defined in the appended claims.

I claim:

1. A product singulator for use in an automatic order filing system for singulating individual products comprising:
   a first conveyor belt for supplying a stream of products to be singulated;
   a selectively controlled inclined conveyor belt, said inclined conveyor having an upstream input end and a downstream output end, said upstream input end positioned for receiving the stream of products to be singulated from the first conveyor belt;
   a vacuum control element mounted at the surface of said inclined conveyor belt for picking a product from the first conveyor belt and holding the picked product under vacuum control to the surface of the inclined conveyor belt during movement toward the downstream output end, said vacuum control element comprising:
      an exciter pad positioned on the conveyor belt surface having a higher coefficient of friction than the surface of the conveyor belt; and
      an opening extending through the exciter pad and the conveyor belt;
   means connected to said vacuum control element for generating a vacuum through the opening extending through the exciter pad to establish a vacuum force between the picked product and the inclined conveyor belt whereby products received by the inclined conveyor belt other than gripped products fall from the conveyor belt; and
   control means responsive to a product input signal to generate control signals to selectively control the rate of movement of the inclined conveyor belt and cause product singulation.

2. The product singulator according to claim 1 further comprising means for sensing picked product location and overlapping products and generating signals indicative thereof applied to said control means.

3. The product singulator according to claim 2 wherein said means for sensing comprises a position detector mounted at the downstream output end of the inclined conveyor belt for sensing the position of a product.

4. The product singulator according to claim 3 wherein said means for sensing further comprises an overlapping product detector mounted to the inclined conveyor belt upstream from the position detector at a distance greater than a length of one product to detect overlapping products.

5. The product singulator according to claim 1 wherein said means for generating a vacuum comprises a vacuum manifold underlying the inclined conveyor belt, the manifold coupled to a vacuum source.

6. The product singulator according to claim 1 further comprising a pinch roller mounted at the downstream output end of the inclined conveyor for placing a picked product under pinch control.

7. The product singulator according to claim 1 further comprising means for collecting products received by the inclined conveyor belt from the first conveyor belt and not held by the vacuum to the inclined conveyor, said means for collecting comprising a slide below a side edge of the inclined conveyor belt to catch non-held products falling off the inclined conveyor belt.

8. Apparatus for singulating a stream of soft products comprising:
an inclined conveyor belt;
means for supplying a stream of products to overlay a lower end of the inclined conveyor belt having an upper end such that a portion of the stream of products extends over a side edge of the conveyor belt;
means for gripping a product with the inclined conveyor belt;
means for actuating the conveyor belt to pull the gripped product along the conveyor belt; and
means for holding the gripped product to the actuated conveyor belt while the conveyor belt carries the gripped product towards the upper end whereby products other than a gripped product fall from the conveyor belt.

9. Apparatus for singulating soft products according to claim 8 wherein the conveyor belt includes a vacuum control element and the means for gripping further includes a vacuum control element for applying a vacuum to a product said vacuum control element mounted to the conveyor belt.

10. Apparatus for singulating soft products according to claim 8 wherein the conveyor belt includes a vacuum control element and the means for holding the gripped product further includes means for applying a vacuum force to the gripped product with the vacuum control element as the product is transported toward the upper end of the conveyor belt.

11. Apparatus for singulating soft products according to claim 8, wherein the means for supplying a stream of products further includes means for positioning the center of gravity of the supplied product over the side edge of the conveyor, such that product supplied by the means for supplying in addition to the gripped product fall from the conveyor belt.

12. Apparatus for singulating soft products according to claim 8 further including:
means for sensing the presence of the gripped product at the upper end of the conveyor belt and generating a product presence signal;
means responsive to the product presence signal for stopping actuation of the conveyor belt upon sensing the gripped product at the upper end of the conveyor belt;
means for placing the gripped product under the control of a pinch roller at the upper end of the conveyor belt to position the gripped product for dispensing; and
means for actuating the conveyor belt to dispense the gripped product under control of the pinch roller and positioned at the upper end of the conveyor belt in response to a dispensing signal.

13. Apparatus for singulating soft products according to claim 8 further including:
means for sensing the presence of products on the conveyor belt in addition to the gripped product; and
means for stopping actuation of the conveyor belt upon sensing the presence of an additional product to allow the additional product to fall from the conveyor belt.

14. A method for singulating a stack of products with a vacuum beam product dispenser including a selectively controlled inclined vacuum conveyor belt having an input end and an output end, and a container for holding a stack of products overlaying the input end of the conveyor belt, comprising the steps of:
positioning a container from a horizontal conveyor belt adjacent to the input end of the inclined conveyor belt;
gripping a single product from a product stack;
rotating the conveyor belt in direction to pull the gripped product from the stack of products;
applying a vacuum to the gripped product as the conveyor rotates to hold the product to the conveyor for movement of the product toward the output end, all products pulled from the product stack not subject to an applied vacuum fall from the inclined conveyor belt; and
dispensing the product from the output end of the conveyor belt by releasing the vacuum applied to the product.

15. The method of singulating soft products according to claim 14 wherein the step of moving a container further comprises the steps of:
actuating the horizontal conveyor belt to place an empty section of the conveyor adjacent to the input end of the inclined conveyor belt;
pushing an empty container from the input end of the inclined conveyor belt onto the horizontal conveyor belt;
actuating the horizontal conveyor belt to place a replenishing container adjacent to the input end of the inclined conveyor belt; and
pushing the replenishing container from the horizontal conveyor into a position overlapping the input end of the inclined conveyor belt.

16. An automatic order dispensing system for dispensing soft products comprising:
a central output conveyor;
a plurality of vacuum beam product singulators contiguous to the central-output conveyor for delivering selected products to the central conveyor according to a product-dispensing input, each vacuum beam product singulator having an infeed conveyor belt and a vacuum control element mounted on the infeed conveyor belt, said vacuum-control element picking a product from a stack of products and placing the picked product under vacuum control to be carried to a second end of the infeed conveyor for product delivery to said output conveyor;
a horizontal conveyor perpendicular and adjacent to an input end of said infeed conveyor belt including means responsive to the product dispensing input to cause movement of the horizontal conveyor;
means for supporting a container holding the stack of products in a position that the products overlay the input end of the infeed conveyor belt;
first means for pushing the container from said means for supporting onto the horizontal conveyor; and
second means for pushing a container from the horizontal conveyor onto said means for supporting.

* * * * *